(12) United States Patent
Cole

(10) Patent No.: US 10,850,754 B2
(45) Date of Patent: Dec. 1, 2020

(54) DISTRIBUTED FIBRE OPTIC SENSING FOR MONITORING RAIL NETWORKS

(71) Applicant: OPTASENSE INC., Santa Clara, CA (US)

(72) Inventor: Stephen Patrick Cole, Huntington Beach, CA (US)

(73) Assignee: Optasense Inc., Santa Clara, CA (US)

( * ) Notice: Subject to any disclaimer, the term of this patent is extended or adjusted under 35 U.S.C. 154(b) by 378 days.

(21) Appl. No.: 15/778,867

(22) PCT Filed: Dec. 1, 2016

(86) PCT No.: PCT/GB2016/053783
§ 371 (c)(1),
(2) Date: May 24, 2018

(87) PCT Pub. No.: WO2017/093741
PCT Pub. Date: Jun. 8, 2017

(65) Prior Publication Data
US 2018/0354534 A1 Dec. 13, 2018

Related U.S. Application Data

(60) Provisional application No. 62/261,490, filed on Dec. 1, 2015.

(51) Int. Cl.
*B61L 25/02* (2006.01)
*G01H 9/00* (2006.01)
(Continued)

(52) U.S. Cl.
CPC ............... *B61L 25/021* (2013.01); *B61L 3/06* (2013.01); *B61L 23/041* (2013.01); *B61L 23/30* (2013.01); *B61L 25/025* (2013.01); *G01H 9/004* (2013.01)

(58) Field of Classification Search
CPC .......... G01H 9/00; G01H 9/004; B61L 25/02; B61L 25/021; B61L 25/025; B61L 1/16;
(Continued)

(56) References Cited

U.S. PATENT DOCUMENTS 9,296,401 B1 * 3/2016 Palmer .................. B61L 25/026
9,969,409 B2 * 5/2018 Van Der Merwe ... G01M 17/10
(Continued)

FOREIGN PATENT DOCUMENTS

GB 2442745 4/2008
WO WO 2012/137021 10/2012
(Continued)

*Primary Examiner* — Jason C Smith
(74) *Attorney, Agent, or Firm* — McDonnell Boehnen Hulbert & Berghoff LLP

(57) ABSTRACT

This application describes methods and apparatus for monitoring of rail networks using fibre optic distributed acoustic sensing (DAS), especially for condition monitoring. One method involves taking (902) a first data set corresponding to measurement signals from a plurality of channels of at least one fibre optic distributed acoustic sensor (100) having a sensing fibre (101) deployed to monitor at least part of the path of the rail network (201). The first data set corresponds to measurement signals acquired as a train (202) passed along a first monitored section of the rail network. The method involves identifying (903) a speed of the train through the first monitored section and dividing (904) the first data set into a plurality of time windows. Each time window contains a different subset of the first data set, with the measurement signal for each successive channel in a time window being delayed with respect to the previous channel by a time related to the identified train speed. For each time window, any appropriate time shift is identified (905) and applied (906) to the measurement signals for a channel so as to substantially align the measurement signals of the channels within the time window. The data from the (Continued)

time windows is then combined (907) after any time shifts have been applied to form an aligned first data set; and a characteristic train signal is derived (908) from the aligned first data set. The characteristic signal may be removed from the aligned first data set (1007) to leave remainder data. The characteristic trains signal and/or remainder data may be analysed for condition monitoring.

21 Claims, 5 Drawing Sheets

(51) Int. Cl.
*B61L 3/06* (2006.01)
*B61L 23/30* (2006.01)
*B61L 23/04* (2006.01)

(58) Field of Classification Search
CPC ........ B61L 1/166; B61L 13/06; B61L 23/041; B61L 23/30
See application file for complete search history.

(56) References Cited

U.S. PATENT DOCUMENTS

| | | | |
|---|---|---|---|
| 10,121,377 B2* | 11/2018 | Harada | G01M 5/00 |
| 10,377,397 B2* | 8/2019 | Kelley | B61K 9/12 |
| 10,471,828 B2* | 11/2019 | Plante | G07C 5/085 |
| 10,614,708 B1* | 4/2020 | Cooper | G08G 1/042 |
| 10,737,710 B2* | 8/2020 | Rosenberger | G01D 5/268 |
| 2013/0151203 A1* | 6/2013 | McEwen-King | G06F 17/00 702/189 |
| 2015/0000415 A1* | 1/2015 | Kelley | B61L 15/0054 73/649 |
| 2015/0013465 A1* | 1/2015 | Godfrey | B61L 23/047 73/655 |
| 2018/0354534 A1* | 12/2018 | Cole | B61L 3/06 |

FOREIGN PATENT DOCUMENTS

| | | |
|---|---|---|
| WO | WO 2012/137022 | 10/2012 |
| WO | WO 2013/114135 | 8/2013 |

* cited by examiner

DISTRIBUTED FIBRE OPTIC SENSING FOR MONITORING RAIL NETWORKS

FIELD OF THE INVENTION

This application relates to methods and apparatus for monitoring of rail networks using distributed fibre optic sensing, especially distributed acoustic sensing, and in particular to methods and apparatus for condition monitoring of the rail infrastructure and/or vehicles moving on the network.

BACKGROUND OF THE INVENTION

Fibre optic distributed acoustic sensing (DAS) is a known type of sensing where an optical fibre is deployed as a sensing fibre and repeatedly interrogated with electromagnetic radiation to provide sensing of acoustic activity along its length. Typically one or more input pulses of radiation are launched into the optical fibre. By analysing the radiation backscattered from within the fibre, the fibre can effectively be divided into a plurality of discrete sensing portions which may be (but do not have to be) contiguous. Within each discrete sensing portion mechanical disturbances of the fibre, for instance, strains due to incident acoustic waves, cause a variation in the properties of the radiation which is backscattered from that portion. This variation can be detected and analysed and used to give a measure of the disturbance of the fibre at that sensing portion. Thus the DAS sensor effectively acts as a linear sensing array of acoustic sensing portions of optical fibre. The length of the sensing portions of fibre is determined by the characteristics of the interrogating radiation and the processing applied to the backscatter signals but typically sensing portions of the order of a few meters to a few tens of meters or so may be used.

DAS has been used in a number of applications such as perimeter security and monitoring of linear assets such as pipelines. One particular application where it has been proposed that DAS sensors may be employed is in monitoring of rail networks, for example monitoring trains moving on the rail network.

For monitoring of rail networks, sensing fibres can be deployed to run generally along the path of one or more rail tracks of the rail network. Movement of a train on such a rail track adjacent a DAS sensing fibre will generate acoustic signals/vibrations that can be used to track the vehicle as it moves, providing real time positional information to a resolution of a few tens of metres continuously along the entire length of the monitored section.

DAS has several advantages for such rail network monitoring. DAS can be applied to provide many sensing channels over a long length of fibre, for example DAS can be applied on fibre lengths of up to 40 km or more with contiguous sensing channels of the order of 10 m long. Thus a long stretch of the rail network can be monitored using a single DAS sensor. For lengths of more than 40 km or so several DAS sensors units can be deployed at various intervals to provide continuous monitoring of any desired length of the transport network.

The sensing fibre may be standard telecoms fibre and thus is relatively cheap. The fibre may be simply buried alongside the transport networks, e.g. along the sides or underneath tracks or roads in a narrow channel and is relatively easy install. The optical fibre can be encased in a protective casing, i.e. in a cable, and can survive for a long time with no maintenance. Thus installation and maintenance costs are low. In many transport networks there may already be optic fibre deployed along at least the major routes and such existing communications infrastructure may comprise redundant optical fibres that can be used for DAS.

The optical fibre is interrogated by optical pulses generated by the interrogator unit and thus power is only needed for the interrogator units.

In a rail network setting a DAS system thus provides the ability to achieve both a desired spatial resolution and scope of coverage that would be very difficult and costly to achieve using other sensing technologies and which allows for real-time monitoring and/or control of the transport network.

SUMMARY OF THE INVENTION

Embodiments of the present invention thus relate to methods and apparatus for distributed fibre optic sensing for rail monitoring.

Thus according to one aspect of the present invention there is provided a method of monitoring a rail network comprising:
taking a first data set corresponding to measurement signals from a plurality of channels of at least one fibre optic distributed acoustic sensor having a sensing fibre deployed to monitor at least part of the path of the rail network, wherein the first data set corresponds to measurement signals acquired as a train passed along a first monitored section of the rail network;
identifying a speed of the train through the first monitored section;
dividing the first data set into a plurality of time windows, each time window comprising a different subset of the first data set, wherein each time window comprises measurement signals from the plurality of channels, the measurement signal for each successive channel in a time window being delayed with respect to the previous channel by a time related to the identified train speed;
for each time window, identifying and applying any time shift to the measurement signals for a channel so as to substantially align the measurement signals of the channels within the time window;
combining the time windows after any time shifts have been applied to form an aligned first data set; and
deriving a characteristic train signal from the aligned first data set.

The method of this aspect of the invention thus identifies a consistent signal in the data from several channels of DAS data relating to passage of the train as the characteristic train signal. In order to identify this signal the speed of the train is taken into account so that the measurement signals from different DAS channels from passage of the same parts of the train can be considered. It has been appreciated however that whilst a single speed value can be determined for the train as a whole different parts of the train may be moving at different speeds at different times and the coupling between the cars of the train may affect identification of a consistent train signal. The method of this aspect therefore processes the data in time windows as will be described in more detail below so as to align the measurement signals and allow the characteristic train signals which is consistent across DAS channels to be identified.

In some embodiments the time windows overlap with one another. This can aid with reassembling the time adjusted data of the time windows into the aligned first data set.

The characteristic train signal may be derived by summing the measurement signals of a plurality of the channels of the aligned first data set, which may in some embodiments include all of the channels of the first data set.

The step of identifying and applying any time shift to the measurement signals for a channel so as to substantially align the measurement signals of the channels within the time window may comprise summing the measurement signals of at least some of the channels to form a pilot signal and iteratively for each channel identifying a time shift to align that measurement signal for that channel to the pilot signal and updating the pilot signal.

In some embodiments identifying and applying any time shift to the measurement signals for a channel so as to substantially align the measurement signals of the channels within the time window comprises applying at least first and second alignment passes. The first alignment pass may be applied to measurement signals in the time windows that have been low pass filtered. Additionally or alternatively the first alignment pass may be applied to measurement signals in the time windows that have been processed to a lower resolution. The first alignment pass may be used to determine a first set of time shifts which are applied to the channels each time window before the second alignment pass. The second alignment pass may be performed on higher resolution data and/or data of a greater frequency range, e.g. unfiltered data.

The method may comprise removing the characteristic train signal from a data set of interest to leave a remainder data set. The remainder data set thus represents the acoustic response of the environment to the stimulus of the train passage, which may be dominated by the response of the track, and also any irregular train related signals. The remainder signal may thus provide useful information about the condition or operation of the train and/or the track.

The data set of interest may be the aligned first data set. In some embodiments however the data set of interest may comprise an aligned second data set, the aligned second data set corresponding to a second data set of measurement signals from a plurality of channels of at least one fibre optic distributed acoustic sensor acquired as the train passed along a second monitored section of the rail network that has been processed to align the measurement signals from different channels. The method may further comprising forming the aligned second data set by a similar process as used for the aligned first data set. Thus the method may comprise taking the second data set; identifying a speed of the train through the second monitored section; dividing the second data set into a plurality of time windows, each time window comprising a different subset of the second data set, wherein each time window comprises measurement signals from the plurality of channels, the measurement signal for each successive channel in a time window being delayed with respect to the previous channel by a time related to the identified train speed through the second section; for each time window, identifying and applying any time shift to the measurement signals for a channel so as to substantially align the measurement signals of the channels within the time window; and combining the time windows after any time shifts have been applied to form the aligned second data set.

In some embodiments removing the characteristic train signal from the data set of interest may involve subtracting the characteristic train signal from the aligned first data set. The subtraction may be a least squares based adaptive subtraction.

The method may also involve processing the remainder data set to reverse any time shifts applied to align the measurement data from different channels.

In some embodiments a deconvolution is applied to the data set of interest based on the characteristic train signal to leave the remainder data set. In some embodiments the method comprises applying interferometric imaging techniques to the data set of interest based on the characteristic train signal as a source signal.

The remainder data set may be analysed with respect to one or more previously acquired remainder data sets for the same section of track. This may highlight any significant changes which may be indicative of the occurrence or possible onset of a problem with the track and/or highlight any signal components due to irregular train signals. The remainder data set may be compared with at least one reference track profile. The reference track profile may comprises an average of remainder data sets obtained from previous train passes. Additionally or alternatively the method may involve performing trend analysis based on the remainder data set and the one or more previously acquired remainder data sets. As mentioned the method may involve identifying any train related components of signals in the remainder data.

As well as or instead of analysing the remainder data the method may comprise analysing the characteristic train signal. The characteristic train signal may be compared to one or more reference train signals for that train. This may highlight changes indicative of an actual or developing fault. The reference train signal may be based on at least one previously acquired characteristic train signal for that train.

In another aspect of the invention there is provided a method of monitoring a rail network comprising:
    taking a first data set corresponding to measurement signals from a plurality of channels of at least one fibre optic distributed acoustic sensor having a sensing fibre deployed to monitor at least part of the path of the rail network, wherein the first data set corresponds to measurement signals acquired as a train passed along a first monitored section of the rail network;
    identifying a speed of the train through the first monitored section;
    dividing the first data set into a plurality of time windows, each time window comprising a different subset of the first data set, wherein each time window comprises measurement signals from the plurality of channels, the measurement signal for each successive channel in a time window being delayed with respect to the previous channel by a time related to the identified train speed;
    for each time window, identifying and applying any time shift to the measurement signals for a channel so as to substantially align the measurement signals of the channels within the time window;
    combining the time windows after any time shifts have been applied to form an aligned first data set; and
    removing a characteristic train signal from the aligned first data set to leave a remainder data set.

The method of this aspect of the invention thus provides remainder data for a section of track by removing a characteristic train signal—which may be derived from that DAS data or from other DAS data as will be described in more detail later.

As mentioned above the time windows may overlap with one another.

In some embodiments the characteristic train signal is derived by summing the measurement signals of a plurality of the channels of the aligned first data set. However in some embodiments the characteristic train signal may be a signal that has been derived by analysing a second data set corresponding to a second data set of measurement signals from a plurality of channels of at least one fibre optic distributed acoustic sensor acquired as the train passed along a second monitored section of the rail network that has been processed to align the measurement signals from different channels. The method may thus comprise forming the characteristic signal from the second data set in a similar fashion as described above with respect to the first aspect of the invention. Thus the method may involve: taking the second data set; identifying a speed of the train through the second monitored section; dividing the second data set into a plurality of time windows, each time window comprising a different subset of the second data set, wherein each time window comprises measurement signals from the plurality of channels, the measurement signal for each successive channel in a time window being delayed with respect to the previous channel by a time related to the identified train speed; for each time window, identifying and applying any time shift to the measurement signals for a channel so as to substantially align the measurement signals of the channels within the time window; combining the time windows after any time shifts have been applied to form an aligned second data set; and deriving a characteristic train signal from the aligned first data set.

In this the step of identifying and applying any time shift to the measurement signals for a channel so as to substantially align the measurement signals of the channels within the time windows applied to the first data set may further comprise aligning the measurement signals with the characteristic train signal.

As discussed above in relation to the first aspect aligning the data within time windows may involve applying at least first and second alignment passes.

The characteristic train signal may be subtracted from the aligned first data set, for example using a least squares based adaptive subtraction.

The method may further comprise processing the remainder data set to reverse any time shifts applied to align the measurement data from different channels.

A deconvolution may be applied to the aligned first data set based on the characteristic train signal to leave the remainder data set. The method may comprise applying interferometric imaging techniques to the aligned first data set based on the characteristic train signal as a source signal.

As noted in respect to the first aspect the remainder data set may be analysed with respect to one or more previously acquired remainder data sets for the same section of track. The remainder data set may be compared with at least one reference track profile which may comprise an average of remainder data sets obtained from previous train passes. Trend analysis may be performed based on the remainder data set and the one or more previously acquired remainder data sets.

The method may involve identifying any train related components of signals in the remainder data.

Aspects also relate to a computer program product comprising computer readable code on a non-transitory storage medium, the computer readable code comprising instructions for causing a computer apparatus to perform the method of any of the variants of the first aspect and/or the method of any of the variants of the second aspect.

Aspects also relate to a rail network monitoring apparatus comprising;
a memory for storing a first data set corresponding to measurement signals from a plurality of channels of at least one fibre optic distributed acoustic sensor having a sensing fibre deployed to monitor at least part of the path of the rail network, wherein the first data set corresponds to measurement signals acquired as a train passed along a first monitored section of the rail network; and
a processor configure to:
identify a speed of the train through the first monitored section;
divide the first data set into a plurality of time windows, each time window comprising a different subset of the first data set, wherein each time window comprises measurement signals from the plurality of channels, the measurement signal for each successive channel in a time window being delayed with respect to the previous channel by a time related to the identified train speed;
for each time window, identify and apply any time shift to the measurement signals for a channel so as to substantially align the measurement signals of the channels within the time window;
combine the time windows after any time shifts have been applied to form an aligned first data set; and
derive a characteristic train signal from the aligned first data set.

In a further aspect there is provided a rail network monitoring apparatus comprising;
a memory for storing a first data set corresponding to measurement signals from a plurality of channels of at least one fibre optic distributed acoustic sensor having a sensing fibre deployed to monitor at least part of the path of the rail network, wherein the first data set corresponds to measurement signals acquired as a train passed along a first monitored section of the rail network; and
a processor configured to:
identify a speed of the train through the first monitored section;
divide the first data set into a plurality of time windows, each time window comprising a different subset of the first data set, wherein each time window comprises measurement signals from the plurality of channels, the measurement signal for each successive channel in a time window being delayed with respect to the previous channel by a time related to the identified train speed;
for each time window, identify and apply any time shift to the measurement signals for a channel so as to substantially align the measurement signals of the channels within the time window;
combine the time windows after any time shifts have been applied to form an aligned first data set; and
remove a characteristic train signal from the aligned first data set to leave a remainder data set.

Rail monitoring apparatus may be implemented to operate in accordance with any of the variants of the methods described above.

Rail network monitoring apparatus may further comprise at least one fibre optic distributed acoustic sensor for acquiring said first data set.

DESCRIPTION OF THE DRAWINGS

The invention will now be described by way of example only with respect to the accompanying figures, of which.

DESCRIPTION OF THE INVENTION

Embodiments of the present disclosure relate to monitoring of a rail network using distributed fibre optic sensing, and in particular fibre optic distributed acoustic sensing (DAS).

As mentioned previously DAS is a known technique where an optical fibre, referred to herein as a sensing fibre, is deployed in an area of interest and interrogated with optical radiation so as to determine information about environmental disturbances affecting various sensing portions of the optical fibre.

Figure 1:
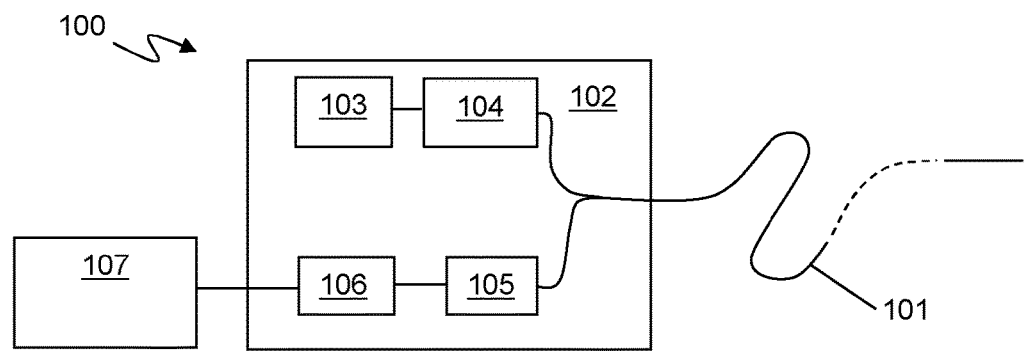
FIG. 1 illustrates a fibre optic distributed acoustic sensor.

FIG. 1 illustrates one example of a DAS sensor 100. The DAS sensor comprises an optical fibre 101 disposed as a sensing fibre and optically coupled at one end to an interrogator unit 102, either directly through some suitable connection (which may be a removable connection) or in some instances indirectly, e.g. via an intermediate fibre or the like. The sensing fibre 101 can be many kilometres in length and can be, for instance 40 km or more in length. The sensing fibre may be a standard, unmodified single mode optical fibre such as is routinely used in telecommunications applications without the need for deliberately introduced reflection sites such a fibre Bragg grating or the like. The ability to use an unmodified length of standard optical fibre to provide sensing means that low cost readily available fibre may be used. However in some embodiments the sensing fibre may comprise an optical fibre which has been fabricated or arranged to be especially sensitive to incident vibrations. Typically the sensing optical fibre will form part of a fibre optic cable structure, possibly as one of a bundle of optical fibres within the cable and optionally with other components such as strengthening or armouring elements or elements arranged to tailor the response to transverse strains. As the sensing fibre is typically relatively inexpensive the sensing fibre may be deployed in a location in a relatively permanent fashion as the costs of leaving the fibre in situ are not significant. For example at least parts of the sensing fibre may be buried in the ground alongside the rail track.

In operation the interrogator unit 102 launches coherent interrogating electromagnetic radiation, which may for example comprise a series of optical pulses having a selected frequency pattern, into the sensing fibre. The optical pulses may have a frequency pattern as described in patent publications GB2,442,745 or WO2012/137022, the contents of which are hereby incorporated by reference thereto, although DAS sensors using other forms of pulsed interrogating radiation or a continuously modulated wave are also known and may be used. Note that as used herein the term "optical" is not restricted to the visible spectrum and optical radiation includes infrared radiation and ultraviolet radiation. The interrogator unit 102 therefore comprises at least one laser 103 and at least one optical modulator 104 for producing the interrogating radiation, which in one embodiment may comprise a plurality of optical pulses separated by a known optical frequency difference.

As described in GB2,442,745 or WO2012/137022 the phenomenon of Rayleigh backscattering results in some fraction of the light input into the fibre being scattered back to the interrogator unit, where it is detected and processed to provide a measurement signal which is representative of disturbances acting on the fibre. As the interrogating radiation is coherent the Rayleigh backscatter received back at the interrogator at any instant is an interference signal of the backscatter generated within the fibre from a particular position in the fibre. It will be noted this Rayleigh backscatter is generated by interaction between the interrogating radiation and inherent scattering sites present within the optical fibre. Thus the sensing function may be effectively distributed throughout the whole sensing fibre (although the returns are processed in time bins to provide results from individual sensing portions of the fibre). Such a sensor is therefore referred to as a distributed sensor or intrinsic sensor as the sensing is distributed throughout and intrinsic to the fibre itself. This is in contrast to sensors based on fibres having fibre Bragg gratings (FBGs) or similar deliberately introduced extrinsic reflection sites where the sensing function is provided in defined areas, typically as a point sensor.

The distribution of scattering sites throughout an optical fibre is effectively random and thus the backscatter interference signal includes a component that varies randomly along the length of the sensing fibre. However in general, in the absence of any environmental stimulus acting on the sensing fibre the characteristics of the backscatter from a given sensing portion of the fibre will be the same for successive interrogations (assuming the characteristics of the interrogating radiation do not change). However an environmental stimulus such as an incident acoustic wave that creates a dynamic strain on a section of fibre will result in a change in the effective optical path length for that sensing portion with a resultant variation in the properties of the backscatter interference signal from that section. This variation can be detected and used to indicate the extent of disturbances acting on the sensing fibre.

The interrogator unit 102 thus also comprises at least one photodetector 105 arranged to detect radiation which is Rayleigh backscattered from the intrinsic scattering sites within the fibre 101. It should be noted however that whilst a Rayleigh backscatter DAS sensor is very useful in embodiments of the present invention, systems based on Brillouin or Raman scattering are also known and could be used in some embodiments of the invention.

The signal from the photodetector is processed by signal processor 106 in time bins corresponding to the round trip travel time to defined sensing portions of the sensing fibre. The signals in each of the time bins are processed to detect variation in the backscatter properties and generate a measurement signal for each sensing portion.

In some examples the signal processor demodulates the returned signal based on the frequency difference between the optical pulses of interrogating radiation launched into the sensing fibre. The interrogator may operate as described in GB2,442,745 or WO2012/137022 for example or as described in WO2012/137021. In some embodiments the signal processor may also apply a phase unwrap algorithm.

The phase of a measurement signal may be derived from the backscattered light from various sections of the optical fibre. Any changes in the effective optical path length within a given section of fibre, such as would be due to incident pressure waves causing strain on the fibre will lead to a change in the measured phase between repeated interrogations. Thus dynamic changes acting on the fibre can therefore be detected in each of a plurality of sensing portions of the optical fibre. The magnitude of the change in phase is related to the effective change in optical path length and hence indicative of the strain on that sensing portion of the sensing fibre.

The form of the optical input and the method of detection allow a single continuous optical fibre to be spatially resolved into discrete longitudinal sensing portions. That is, the acoustic signal sensed at one sensing portion can be provided substantially independently of the sensed signal at an adjacent portion. The spatial resolution of the sensing portions of optical fibre may, for example, be approximately 10 m, which for a continuous length of fibre of the order of 40 km say provides 4000 independent acoustic channels or so deployed along the 40 km of fibre. More channels could be arranged on a fibre with a different channel width.

Note that term "acoustic" shall mean any type of pressure wave or mechanical disturbance that may result in a change of strain on an optical fibre and for the avoidance of doubt the term acoustic be taken to include ultrasonic and subsonic waves as well as seismic waves or other induced vibrations. As used in this specification the term "distributed acoustic sensing" or "DAS" will be taken to mean sensing by optically interrogating an optical fibre to provide a plurality of discrete acoustic sensing portions distributed longitudinally along the fibre and the term "distributed acoustic sensor" shall be interpreted accordingly.

The output from the interrogator unit 102 may thus be a measurement signal for each sensing portion of the relevant sensing fibre 101 which is indicative of the acoustic signals or dynamic strains acting on that sensing portion. The individual sensing portions may also be referred to as channels of the DAS sensor. The output of the interrogator unit 102 may be passed to a data processor 107 which may be configured to analyse the measurement signals for the various channels. The data processor 107 may be co-located with the interrogator unit 102 or remote therefrom.

Figure 2:
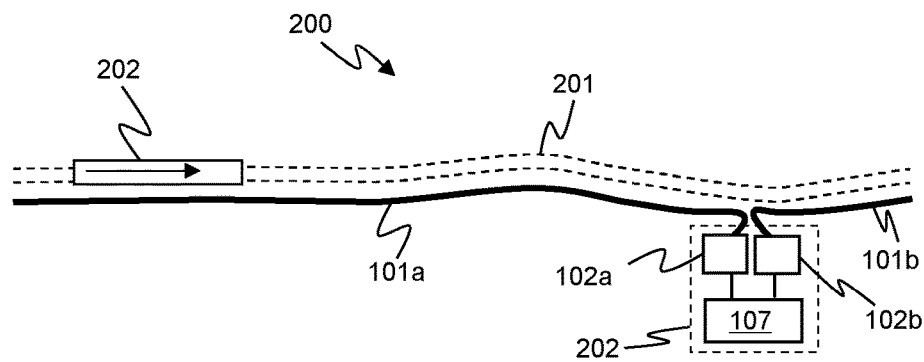
FIG. 2 illustrates distributed acoustic sensing (DAS) applied to monitoring a rail network.

For monitoring a rail network one or more sensing fibres 101 may be deployed to run along the path of parts of the rail network. FIG. 2 illustrates a DAS sensor apparatus 200 for monitoring a rail network. Note that as used herein a reference to monitoring a rail network shall be taken to mean monitoring at least part of a rail network, i.e. at least part of one or more rail tracks of the rail network. FIG. 2 illustrates a section of rail track 201 along which a train 202 may travel. FIG. 2 illustrates that the sensing fibres 101a and 101b are deployed so as to run generally alongside the track being monitored and at a relatively constant separation from the track such that the fibre is locally parallel to the track. This may be a convenient arrangement as the sensing portions of the sensing fibre 101 may be directly mapped to corresponding portions of the rail track 201. The sensing fibre may be deployed along the track in any convenient manner and may for instance be buried alongside the track, either directly in the ground or under the track ballast or in some suitable conduit. In other embodiments at least part of the sensing fibre may be coupled to the rail itself. In some instances however, especially if using optical fibres that were originally installed for a purpose other than DAS, the optical fibre may, at certain locations, not run parallel to the track and/or there may at some point be loops of optical fibre or part of the optical fibre may divert away from the track. In such a case it may be necessary to calibrate the position of the relevant sensing portions of the fibre relevant to the track. There are various ways this can be done as would be known to one skilled in the art of DAS sensing. The individual channels of the DAS sensor may thus be mapped to sections of the track which may have different lengths to one another so that a train moving at constant speed along the track would appear to move linearly across the channels of the DAS sensor.

In the example illustrated in FIG. 2 part of the rail track 201 is monitored by at least part of a first sensing fibre 101a and another part of the rail track 201 is monitored by at least part of a second sensing fibre 101b. The sensing fibres 101a and 101b may be arranged to provide relatively continuous monitoring of a relatively long section of the track 201. Each of the sensing fibres is connected to a respective DAS interrogator unit 102a and 102b, although in some arrangements a single DAS interrogator unit could be multiplexed between different sensing fibres in a time division fashion. In the example illustrated in FIG. 2 the interrogator units 102a and 102b are arranged as part of a sensor station 202 with the sensing fibres 101a and 101b extending in opposite directions along the track 201. This may provide sensing coverage of up to about 80 km of track or more from a single sensor station. A data processor 107 may be located at the sensor station to process the data from the interrogator units 102a and 102b. It will be appreciated that FIG. 2 illustrates just one example however and various different arrangements may be implemented depending on the particular rail network being monitored.

In use each DAS sensor may be operated to monitor the rail network, e.g. interrogator unit 102a interrogates the relevant sensing fibre 101a to provide DAS sensing. Movement of the train 220 along the track 201 will generate various dynamic strains, e.g. acoustic signals, that will propagate to the sensing fibre and be detected by the DAS sensor.

The acoustic signals detected by any given channel of a DAS sensor will depend on the stimulus giving rise to the acoustic signal and the path by which the acoustic signal travels to the sensing fibre. For monitoring a train moving on a rail network the train moving on the rail track acts as a moving acoustic source and the acoustic signals reaching any given sensing portion will depend on the characteristics of the train, the track on which it is moving and the environment surrounding the relevant sensing portion.

It has been appreciated that it would be useful to distinguish between those aspects of the acoustic signal which are due to the characteristics of the train and those aspects of the acoustic signal due to the local environment of a relevant sensing portion.

Embodiments of the present invention thus analyse the acoustic signals from a plurality of DAS channels of one or more DAS sensors in response to a train passing the relevant section of the rail network to identify a characteristic signal associated with the train. In some embodiments the characteristic signal of the train may be analysed so as to determine information about the train and/or for condition monitoring of the train. Additionally or alternatively in some embodiments the acoustic signals from one or more sensing portions may be processed to substantially remove the characteristic signal associated with the train to provide an indication of acoustic signals due to the local environment and/or transient events related to the train. The acoustic signals due to the local environment may be analysed so as to determine information about the local environment and/or for condition monitoring of the local environment, e.g. the local rail track.

A train travelling on a rail tack which is monitored by a DAS sensor produces an acoustic signal with a component that varies due to the composition of the train. In general terms there is a variation in intensity of the measurement signal from a given DAS channel over time that is due to the type and/or distribution of the cars of the train. Thus a measurement signal detected by a channel of a DAS sensor alongside a train track may exhibit a signal component that varies based on the length/axle spacing of the cars of the train and the speed of travel of the train past that sensing portion.

It has been found that as the train track is relatively smooth the acoustic signal due to the movement of a given section of the train past a first sensing portion may be reasonably consistent with the acoustic signal generated by the same section of the train moving past a second different sensing portion, spatially separated along the track from the first sensing portion.

Identifying the characteristic signal of the train may therefore comprise identifying a characteristic pattern in the measurement signals from a plurality of the channels of the DAS sensors due to passage of the train past those channels.

Clearly different parts of the train will pass different channels of the DAS sensor at different times as the train moves down the track. Therefore to allow identification of components of the signal due to the same part of the train in the measurement signals from the various channels it is necessary to take the velocity of the train into account.

However the velocity of the train may vary over time and at different parts of the track. For example when passing a first sensing portion of the fibre at an uphill section of track the train may be travelling slower than when passing a second sensing portion at a downhill section of track, and thus the train may take longer to pass the first section than the second section. In addition, the train will typically comprise at a plurality of connected units, e.g. at least one locomotive and a plurality of connected cars. The various units of the train are connected by couplings that have some compliance. This means that the spacing between the individual cars can vary between a maximum and minimum separation in use and different parts of the same train can be travelling at slightly different speeds to one another at any given moment. This may be especially the case for relatively long trains such as may be used for freight/cargo transport for instance. Such trains may be of the order of several hundred metres or even kilometres in length and over the total length of the train the combined effect of the couplings can lead to relatively significant differences in speed of different parts of the train.

Figure 3:
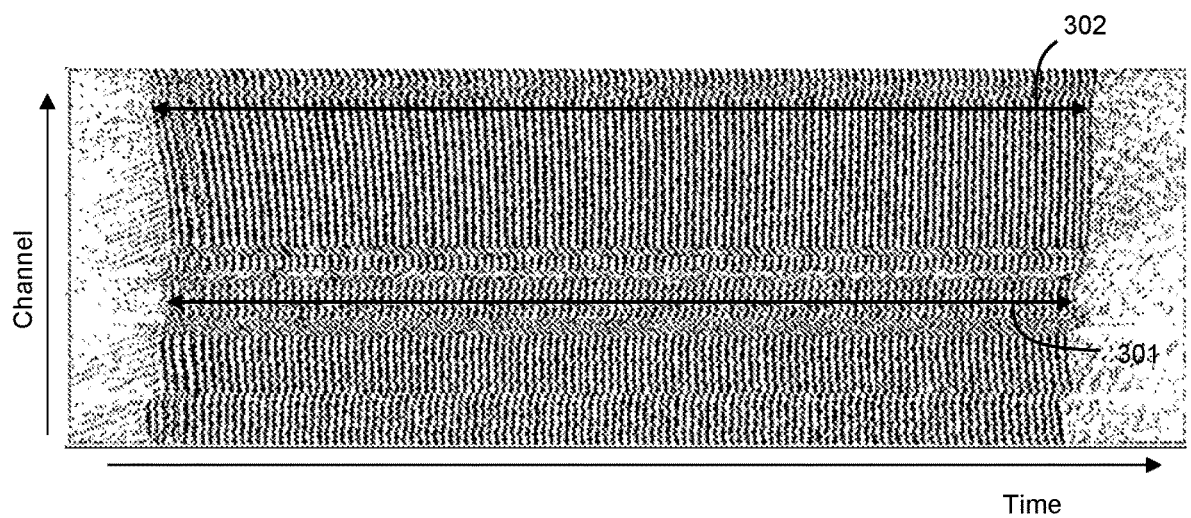
FIG. 3 illustrates example DAS data from a train passing a DAS sensor.

FIG. 3 illustrates example data acquired by a DAS sensor system monitoring a first section of rail track as a train passed by. FIG. 3 illustrates a first data set comprising the measurement signal acquired over time from each of a plurality of channels as the train passes through the first section of track. FIG. 3 is effectively a plot of intensity of the acoustic data with channel along the fibre as the y-axis and time as the x-axis and the measurement signal intensity illustrated by the greyscale intensity. (One skilled in the art will appreciate that a black-and-white representation provides only a crude representation of the data available from a DAS sensor). In this example the data is from 200 contiguous channels of the DAS sensor where the sensing fibre was deployed along the path of the rail track. Each channel corresponds to data from a sensing portion of 10 m in width and thus this corresponds to data from a 2 km long section of the track—and in this example the relevant train was almost 2 km in length. The time period illustrated in FIG. 3 corresponds to about 120 seconds.

The train is moving at a speed of approximately 19.25 $ms^{-1}$ during this period. This velocity component has been removed from the data in FIG. 3 to time align the channels. In other words if the data from each channel corresponds to a 120 s portion of the data acquired by that channel, the start time for the selected portion of data a successive channel (downstream in the direction of train travel) is later than the start time for the data of the previous channel by an amount that corresponds to the time taken to travel the channel width at the specified velocity.

It can be seen from FIG. 3 that the measurement signal from each channel exhibits a reasonably clear repetitive component that results from the train passing the relevant sensing portion. It can also be seen however that the measurement signals from the different channels are not well aligned because the speed of the train varies across the various channels. For example for the channel(s) indicated by arrow 301 it can be seen that the total time for the train to pass is shorter than for the channel(s) indicated by 302. Thus at the point of the track corresponding to channel 301 the train was moving relatively faster than at the portion of track corresponding to channel 302. This results in a variation in timing of the signal evolution, i.e. a 'stretching' or 'squeezing' of the data for some channels compared to others. However the extent of variation in signal evolution is not necessarily even over the whole time period for a given channel, that is one channel may exhibit stretching compared to another channel over just a sub-period of the data. In other words there may be a variation in speed not just from channel to channel but also in the data along a given channel.

Figure 4:
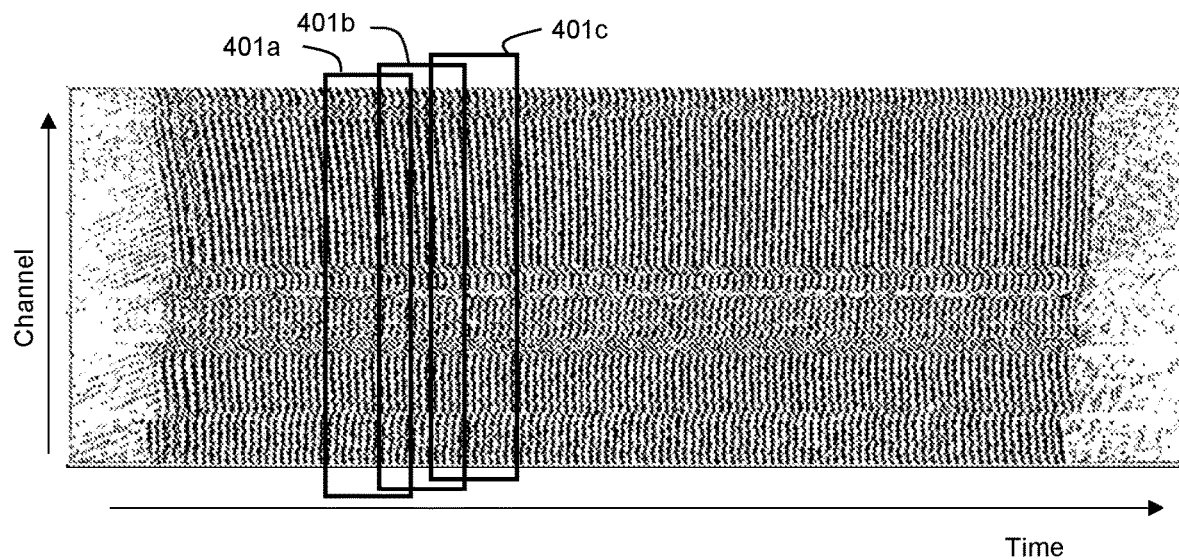
FIG. 4 illustrates processing of DAS data in time windows.

In one embodiment the data is thus processed to provide a time alignment between the various channels. In one method the data is processed in a plurality of time windows, as illustrated in FIG. 4, to time align the data in each channel within the time window. FIG. 4 illustrates that a plurality of time windows 401a-c may be applied to the data to select a subset of the data. Each time window comprises a different subset of the data, i.e. the measurement signals from the plurality of channels. The time window has a relatively short time width, i.e. duration and thus, for each channel, comprises the measurement signal for a short period of time. The relevant short period for each channel varies from one time window to the next, but may be overlapping so that at least part of the measurement signal may appear in two time windows. The time window is selected so that the measurement signal for each channel in the time window should correspond to the same section of train passing the location corresponding to the relevant channel. In this example, where the data has already been aligned to account the general train speed the time window thus spans the same adjusted time period for each channel. However the alignment for general train speed may not necessarily done as a separate step and the time windows could be populated with a suitable delay between channels forming the time window. In either case the data set is divided into a plurality of time windows where the measurement signal for each successive channel in a time window is delayed with respect to the previous channel by a time related to the identified train speed. The data in that time window is then processed to provide time alignment between the various channels within the time window.

The duration of the time window is selected to be relatively short so that the speed of the train is likely to be substantially constant over that period, i.e. there is no significant speed variation in the measurement data from a given channel within a time window. Thus with each time window it may be assumed that the speed of the train for a given channel is constant, although in reality there may still be some small speed variation. The duration of the time window should however be long enough to include identifiable variations in the measurement signal which can be aligned. The variation in signal illustrated in FIG. 3 results from passage of the various cars or units of the train so the time windows should be long enough to allow for passage of several cars. The time window may for instance be long enough for passage of three or more, or four or more train cars. In some instances the time window may be short enough so that no more than 15 or perhaps no more than 10 cars pass a given sensing location in the duration of the time window. In some embodiments if the train consists of n separate units, e.g. locomotives, cars etc., the number of time windows may be of the order of n/4. The use of very short time windows would also be computationally expensive in terms of the processing required.

The data from the various channels is processed so as to be time aligned with the data from the other channels within the time window. In essence for channels within the time window the data is analysed to determine a time slip to be applied to the data from that channel in that window that will time align the measurement signal variation in the various channels.

To align the data in a time window the data from a plurality of channels may be summed to produce a pilot signal. In some embodiments all the channels in the time window are summed to produce the pilot signal but in some embodiments only some of the channels may be used to form the initial pilot signal, for example possibly after applying some quality metric to identify the channels with high signal-to-noise ratio or some other characteristic of a good quality signal. Once the initial pilot signal is formed, the signal from each channel may be cross-correlated with the pilot signal to determine a time shift that will best align the signal from that channel with the pilot signal. The pilot signal is then updated—the contribution of this particular channel to the pilot signal is removed by subtraction, then the signal from this channel is added back into the pilot signal at the new time shift. This process proceeds iteratively for all channels, and may be iterated several times. In some embodiments the alignment process may be iterated until the signals have been optimally aligned. The signals may be considered to be optimally aligned when successive iterations do not change the time shifts. In some embodiments however the alignment procedure may comprise a set number of iterations for computational reasons.

Once the data in each time window has been aligned the various time windows may be reassembled into an aligned data set.

Conveniently the time windows may be overlapping as illustrated in FIG. 4 which illustrates three successive times windows. It can be seen that time window 401b overlaps with time window 401a and that time window 401c overlaps with time window 401b. This aids in alignment of the data across the various time windows, which may be combined in a weighted fashion. If non-overlapping time windows were used the time shift applied in two adjacent time windows could result in a gap in the reassembled data. The degree of overlap may in some embodiments be of the order of 50%, say 35-55% inclusive. That is around 50% of a given time window may overlap with an adjacent time window, although in some embodiments a different amount of overlap, e.g. less than 50%, may be implemented. It should be noted that the time windows illustrated in FIG. 4 are for explanation only and do not necessarily correspond to the duration of the time windows that may be used in practice. Also the time windows are illustrated as being staggered in the vertical direction purely for clarity, this does not imply that the time windows are necessarily applied to different channels. Using the example described above of the number of time windows being selected to be of the order of n/4 where n is the number of cars, then for a train with 100 cars and time windows that overlap by 50% each time window may correspond to the time for passage of about 7-8 cars.

In re-assembling the data, weights may be applied to each of the overlapping time windows in order to reconstitute the signal with no variation in amplitude due to the windowing process. The weights used may depend on the size of the windows and the amount of overlap. In some embodiments the weights may be determined using a least-squares optimization scheme, for example as described by Claerbout, J., 2014, "Geophysical image estimation by example", the contents of which are hereby incorporated by reference thereto.

Note that each time window may comprise all of the channels of DAS data from which it is wished to derive and/or subtract a characteristic train signal. Thus as illustrated in FIG. 4 each time window may comprise a short period of data for each of the 200 DAS channels. In some embodiments however the time windows may each comprise only some of the channels of interest. The same general principle of overlapping time windows may be used. For instance each of the time windows 401a-c could be split into a plurality of different time windows covering the same time period of the data but for only some of the data channels. For instance in the example of FIG. 4 with 200 data channels of interest time window 401a could be divided into three separate time windows each covering the same time period but with a first window including channels 1-100, a second window including channels 51-150 and a third window having channels 101-200. Dividing the channels into different time windows may ease computing requirements. Additionally limiting the number of channels processed in any one time window may help ensure that the alignment process is aligning signals due to the same part of the train passing the relevant sensing portions.

In some embodiments the alignment of the measurement signals in the time windows may comprise multiple stages, i.e. there may be a multiple pass approach to alignment. In one embodiment a first alignment may be applied to a low frequency component of the measurement signals. The characteristic train signal of interest will typically have a strong relatively low frequency component, e.g. of the order of 1-2 Hz or so. Thus looking initially at least at low frequency data may aid in aligning the signal of interest. Conveniently the first alignment may be applied to a low resolution version of the measurement signals. In other words the initial alignment may be relatively coarse, which may reduce the chance of aligning unrelated features. Once the initial alignment is complete, a second pass with higher resolution data may be performed to tweak the alignment and provide the desired accuracy. This second pass may be performed using data of a greater frequency range.

Thus in some embodiments the alignment may comprise low pass filtering the data and aligning the low pass filtered data in the time windows for a first alignment pass. In some instances the data for the first alignment may be decimated. Based on the first alignment some initial time slips for the various channels may be determined. These initial time slips may be applied to the unfiltered measurement signals in the time windows and a second alignment may then be performed.

Figure 5:
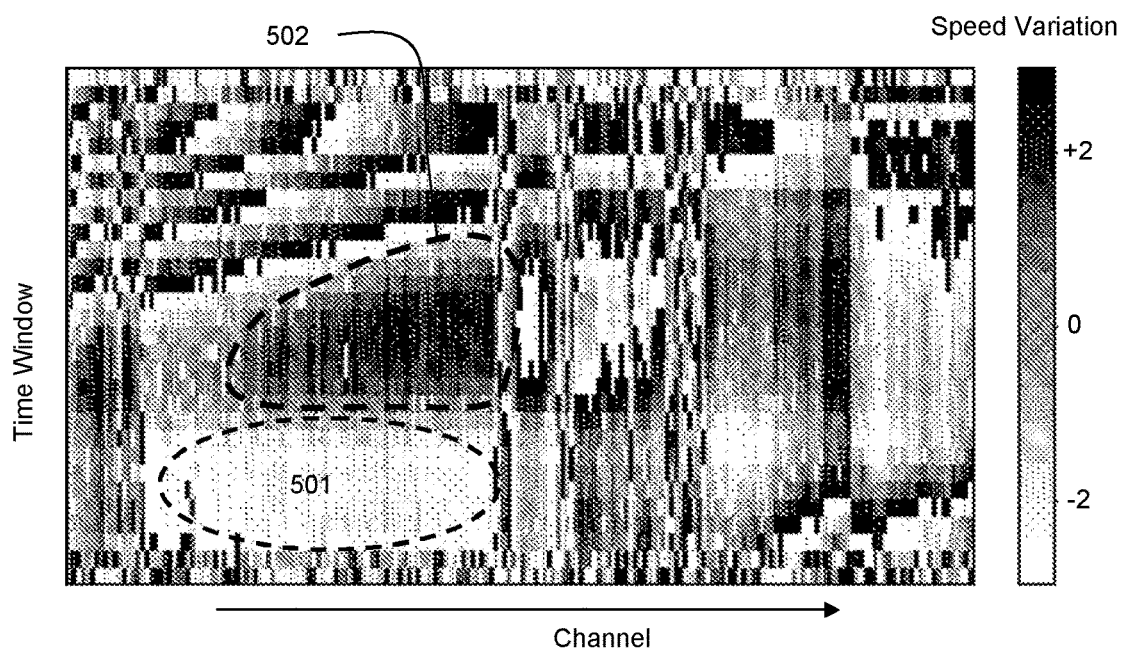
FIG. 5 illustrates an example of the deviation in determined speed from average in the time windows.

The data illustrated in FIG. 3 was processed in time windows as described above to determine suitable time shifts for the various channels. This provides an indication of the relative speed variation of the train for that channel within that time window with regard to the rest of the train. FIG. 5 illustrates a plot of speed variation for various channels of the data in various time windows compared to the average speed of 19.25 ms$^{-1}$. Areas 501 of relatively slower train movement can be identified as can areas 502 of relatively faster train movement. On the whole is shows however that the train speed can vary within and across channels relatively significantly.

Once suitable time shifts have been found for each channel in each time window the time shifts may be applied to the data and the time shifted data from all the channels can be reassembled into a single data set.

Figure 6:
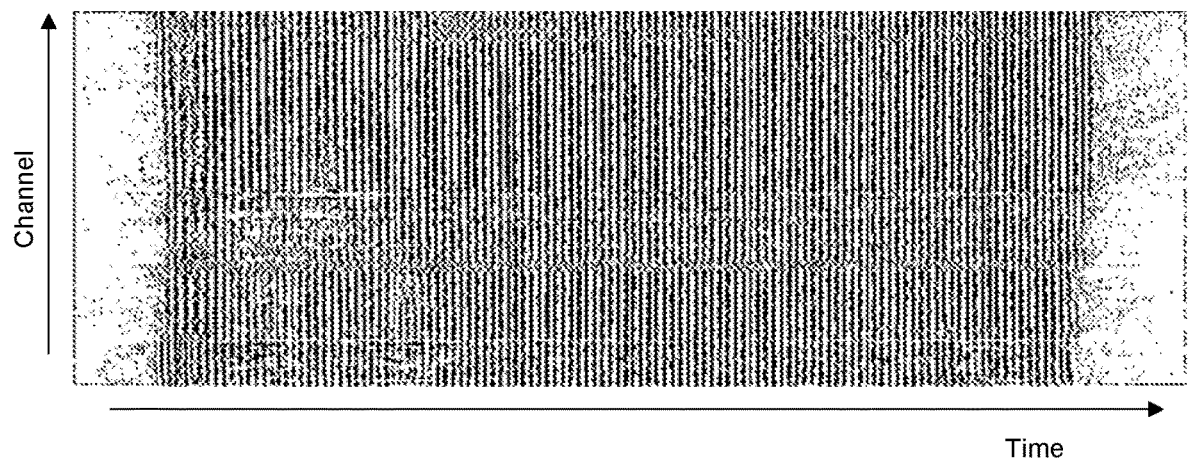
FIG. 6 illustrates aligned DAS data after time shifts have been applied.

FIG. 6 illustrates the data from FIG. 3 after having been processed as described above in time windows to align the measurement signals from the various channels and then reassembled. It can be seen that the alignment of variation in signal across the data channels is significantly improved. In effect the data has been corrected to account for the speed variations of the train across the channels and also over time within a channel.

Having time aligned the data across and within the channels in this way a signal which is specific to the train itself can be identified as a signal which is consistent across a significant number of the channels of data.

Figure 7:
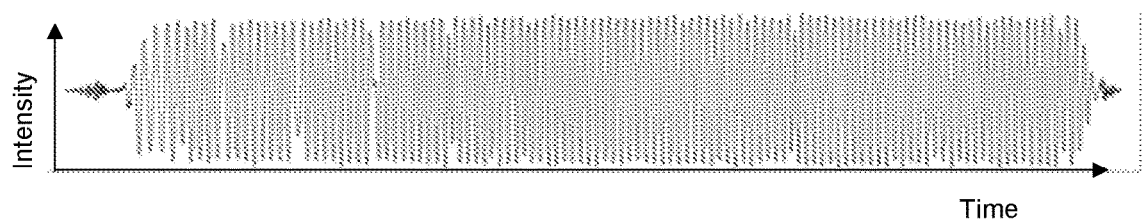
FIG. 7 illustrates an example of a characteristic train signal derived from the aligned DAS data.

This consistent signal specific to the train can be determined in various ways but in one simple embodiment the data across all channels may be summed to provide the signal, which will be referred to herein as a characteristic train signal. FIG. 7 illustrates the resultant acoustic signal formed by summing the data from all channels, i.e. the characteristic train signal.

As mentioned this characteristic train signal is thus a signal indicative of the consistent signal produced by the train as it passes a plurality of DAS channels. In some embodiments this characteristic train signal may be used as a train profile for that train and analysed to provide information about the particular train and may in particular be useful for condition monitoring as will be described in more detail below.

Additionally or alternatively knowing the consistent signal component due to the train, the DAS measurement signals acquired during passage of the train may be analysed to provide information regarding the response of the environment to the acoustic stimulus supplied by the train and/or to identify any transitory signals in the train signal.

In some embodiments the characteristic train signal may be removed, e.g. subtracted, from the measurement signals from one or more DAS sensing channels so as to leave a component of the acoustic signal which excludes the consistent characteristic train signal. The measurement data after such subtraction, which may be referred to as remainder data, may then be analysed as noted above to provide information regarding the environment of the relevant sensing portion, including the rail track, and/or to provide information about transient acoustic signals in the DAS data, i.e. irregular signal components that don't appear consistently in the characteristic train signal.

In some embodiments therefore the identified characteristic train signal, e.g. the isolated signal illustrated in FIG. 7, may be subtracted from the data from at least some of the DAS channels acquired during passage of the train.

The subtraction may be performed in various different ways. In one embodiment the characteristic train signal may be scaled by an appropriate amplitude scaling factor for the relevant channel, e.g. by assuming that the peak-to-peak variation experienced is indicative of the characteristic train signal, and then subtraction may be performed. The subtraction may be an adaptive subtraction, for instance based on a least squares type approach so as to optimise the residual in the subtraction. Adaptive subtraction determines the appropriate scale factor so that when the scaled characteristic train signal is subtracted from the data at a given channel, the result for that channel has the minimum residual energy. In other words, adaptive subtraction matches the amplitude of the characteristic train signal to the signal present in each channel. In this way the characteristic train signal is optimally subtracted from each channel. Such techniques have been applied in other field such as seismology to subtract known signals from data of interest and similar techniques may be applied, for example as described in any of:

Spitz, S., 1999, Pattern recognition, spatial predictability, and subtraction of multiple events: The Leading Edge, 18, 55-58;

Haykin, S., 2001, Adaptive filter theory: Prentice Hall.

Abma, R., N. Kabir, K. H. Matson, S. Mitchell, S. Shaw and B. McLain, 2005, Comparisons of adaptive subtraction methods for multiple attenuation: The Leading Edge, 24, 277-280;

the contents of which are hereby included by reference thereto.

It should be noted that a similar method of adaptive subtraction could be applied to signal spectra such that spectral differences may be observed from channel to channel without concerns of channel sensitivity. This could be applied to both power spectra and squared spectral envelopes. Alignment of the data prior to spectral adaptive subtractive is also beneficial in this case as it should align any spectral components optimising the spectral difference.

Figure 8:
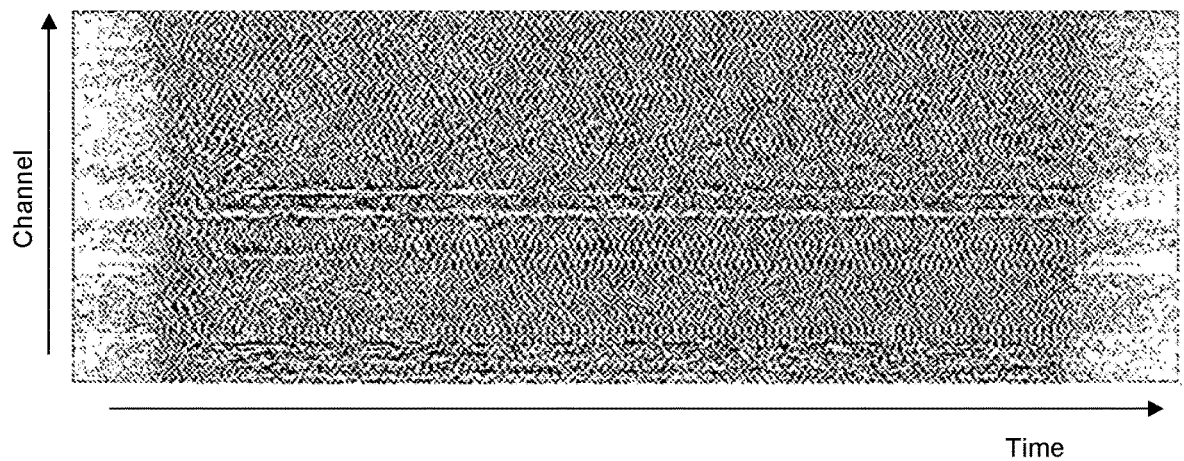
FIG. 8 illustrates an example of remainder data after an identified characteristic train signal is removed from the aligned DAS data.

FIG. 8 illustrates the time aligned remainder data after the characteristic train signal has been removed from all of the data channels, i.e. after the characteristic train signal has been subtracted from the data illustrated in FIG. 6. It can be seen that the regular variation due to the train has been removed but various coherent data features remain in the data corresponding to features of the local environment of the relevant sensing portions. One significant contributor to such signals will be the response of the rail track to the stimulus of the train passing. It can be seen that there are features in the data which are clearly consistent at certain channels of the data through the period of train passage.

It will be appreciated that the remainder data illustrated in FIG. 8 is based on the data of the various DAS channels as time adjusted to provide alignment of the signal component due to the train. Such time adjustment was useful to compensate for velocity variations of the train. Whilst in some instances at least some useful analysis may be performed using this time adjusted remainder data, in at least some instances it may additionally or alternatively be useful to process this remainder data to reverse the time shifts applied during the alignment step. The result will be an indication of the real time evolution of the acoustic signals from each sensor channel to passage of the train but excluding the consistent characteristic train signal itself.

The remainder data after the characteristic train signal has been removed may be analysed to provide information about the local environment. In effect the remainder data provides an indication of the response of the local environment to the stimulus of the passage of the train. The acoustic response to passage of a train detected by any given sensing portion may depend on a number of factors, including how the sensing fibre is acoustically coupled to the rail track, e.g. directly attached or buried alongside etc., but a significant part of the response will be due to the rail track at that location and the condition thereof.

Thus the remainder data produced as described above for a given location of track may be analysed to provide information about the condition of the rail track and/or wider environment at that location. In some embodiments therefore DAS measurement data corresponding to a section of track of interest acquired as a train passes along that section of track may be processed as discussed above to subtract a characteristic train signal corresponding to the train and leave some remainder data.

In some instances remainder data for a given section of track may be obtained and used to determine a track reference profile. As mentioned the remainder data indicates the response of the relevant section of track with the effects of the train itself removed. A track profile could be obtained from several passes of a train over the relevant section of track. In some embodiments the remainder data from several passes of the same train over the given section of track may be obtained and combined in some way, e.g. by averaging, to provide the reference profile, although in some instances remainder data from passes of different trains may be used to form the reference profile. The profile may, for instance, be a single value obtained for the combined remainder data for one or more channels of the DAS sensor corresponding to the relevant section of track. In some instances the combined remainder data may be thresholded to provide the value for each channel or for a group of channels. For instance the averaged data value could be allocated a value based on where it sits in relation to several predefined thresholds and/or ratios of the values may be obtained to provide a reference profile comprising a set of values with each value corresponding to a different part of the track.

Such a reference profile would represent, with a single set of values, some measurement of the condition of the rail for a given section of track. Once a reference track section profile is available then new remainder data from a subsequent train pass may be compared with the existing profile to detect any anomalies or relatively significant variations. In some embodiments the data from the current train pass could be thresholded for comparison and/or correlation with the reference profile. Thresholding in this way means that small variations in the remainder data due to different environmental conditions etc. may not result in any significant detectable change in the profile, whereas a significant variation would present an anomaly. If an anomaly is detected at a particular location along the track, an alarm may be triggered. There may be levels of alarm depending on the difference between the remainder for one pass and the relevant track section profile.

It should be noted that the characteristic train signal does not itself have to be determined using the DAS data from that section of track of interest. Some sections of track monitored by a DAS sensor may, for various reasons, provide a DAS measurement signal which would provide a relatively poor assessment of the characteristic train signal. For instance some sections of track may have poor acoustic coupling between the sensing fibre and the track or may suffer from resonance or some other noise factor. In some section of track there may be good acoustic coupling between the sensing fibre of the rail track but the large signal generated by the train may cause over-scaling of the measurement signal from such sensing portions which may corrupt the low frequency signals of interest. Thus some sections of track will provide a better signal-to-noise ratio (SNR) than other sections for the purposes of determining a characteristic noise signal.

For any section of track some analysis or calibration process may be performed, possibly periodically, to determine those sections of track that provide a consistent estimate of the characteristic train signal using the method described above. The characteristic train signal for any train passing along the track may then be determined using DAS data just from the sections of track that provide the highest quality date. The characteristic signal, having been identified, may then be subtracted from the DAS data for any section of the track which is of interest and which the relevant train traversed.

In general therefore the techniques described here provide a method for identifying a characteristic train signal. This characteristic train signal may advantageously used itself to provide information about the train and/or it may be used to remove the consistent effects of the train from DAS data—whether the DAS data is used to derive the characteristic train signal or other DAS data acquired from the train passing through a different monitored section of track. The resulting remainder data may be analysed to provide information about the track or irregular train related signals.

Figure 9:
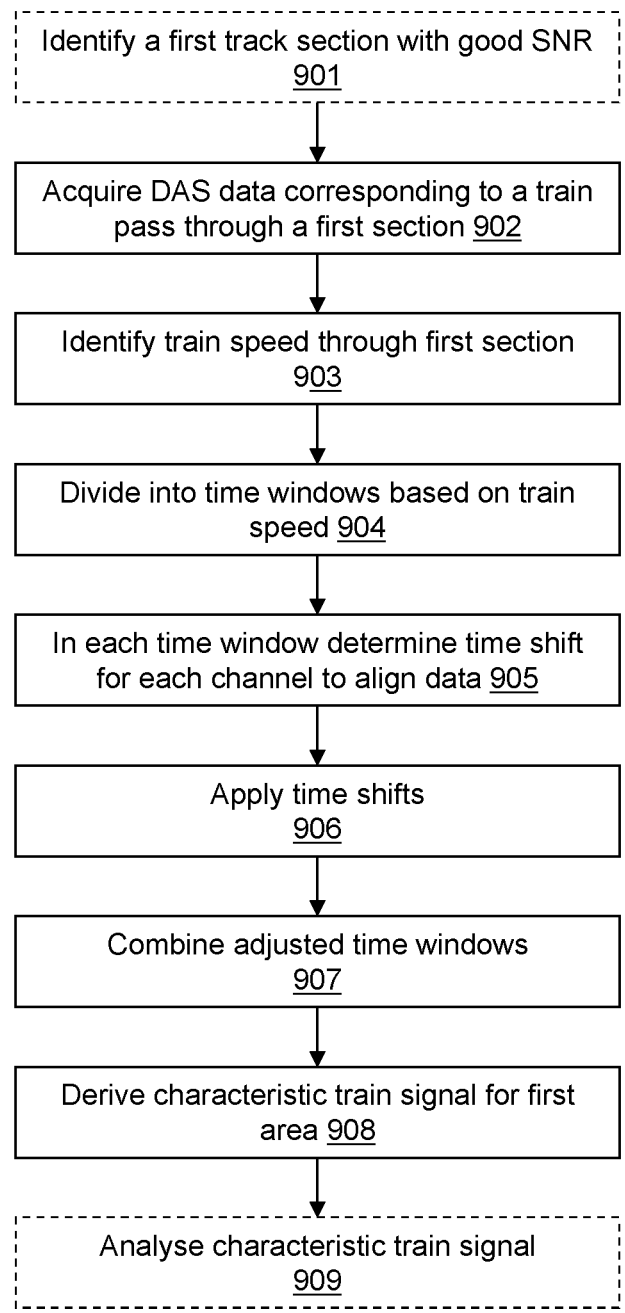
FIG. 9 illustrates a flow chart of a method of deriving a characteristic train signal from DAS data according to an embodiment.

FIG. 9 illustrates one example of a flowchart of a method of deriving a characteristic train signal. As mentioned above there may in some instances be an initial step 901 of identifying at least one area with good SNR useful for estimating the characteristic track signal. This may be done once as an initial calibration or periodically or perhaps by analysing DAS data from a train pass along a long section of track to identify areas with good SNR. DAS data may then be acquired 902 corresponding to a train passing through that first area. In some embodiments the method may comprise operating one or more DAS sensors to acquire the data but method also apply to processing of previously acquired DAS data in which case this step may simply be identifying an appropriate pre-existing data set. The general train velocity through the area may be identified at step 903, either through knowledge of the train's movement or by analysing the DAS data. The train's velocity may be changing through the area and this may be taken into account. The DAS data is then divided 904 into time windows based on the general train velocity, in other words an adjustment for the general train velocity is made and the time windows formed as discussed previously. In each time window a time shift is determined 905 for each channel of DAS data to align the data in that time window. The time shifts are then applied 906 and the time windows recombined 907 into a single data set. From the recombined time aligned data set the characteristic time signal may be derived 908, e.g. by summing the data. In some embodiment this characteristic train signal may be analysed 909 as will be discussed below.

Figure 10:
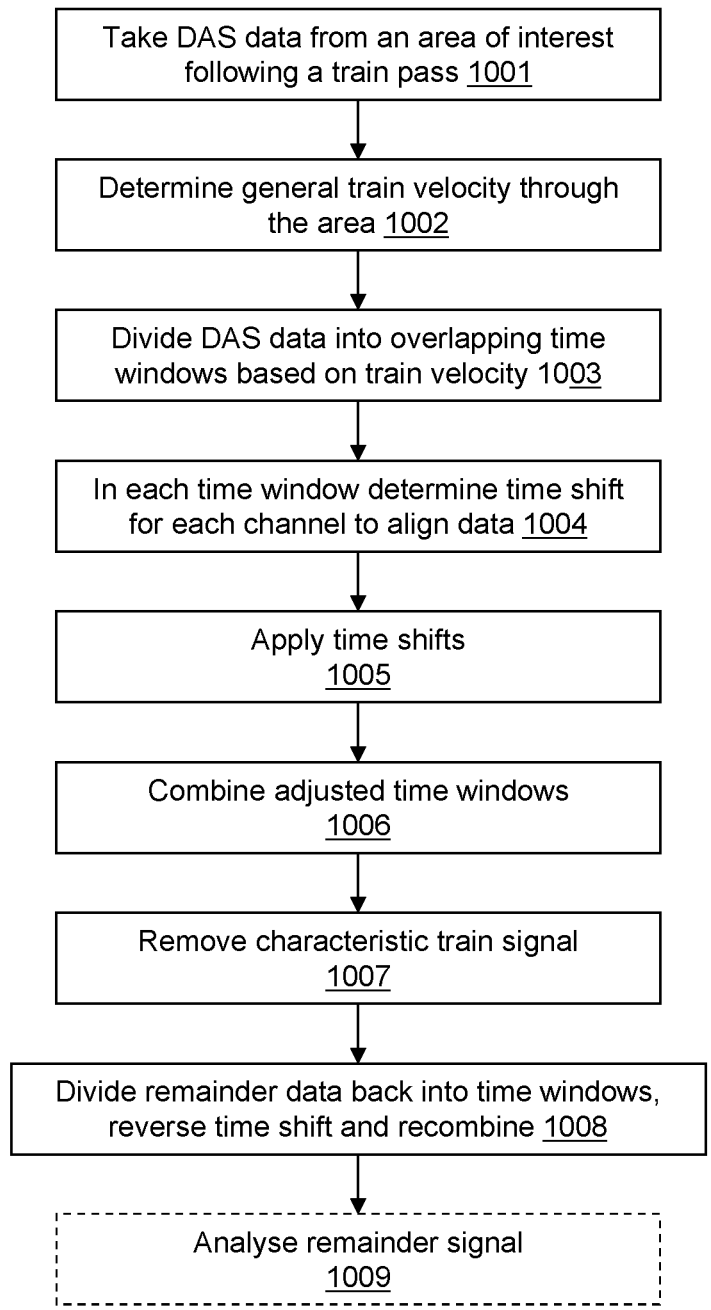
FIG. 10 illustrates a flow chart of a method of removing a characteristic train signal from DAS data according to an embodiment.

FIG. 10 illustrates one example of a flowchart of a method of deriving remainder data. At least some of the steps of the method of FIG. 10 may be common to those of the method of FIG. 9 where the same data is being used to derive the characteristic train signal and produce remainder data—but as mentioned the method of FIG. 10 may be applied to data using a characteristic train signal derived using different data. At step 1001 DAS data corresponding to a train passing through an area of interest is acquired. As discussed in relation to FIG. 9 in some embodiments the method may comprise operating one or more DAS sensors to acquire the data but method also apply to processing of previously acquired DAS data in which case this step may simply be identifying an appropriate pre-existing data set. The general train velocity through the area may be identified at step 1002, and the DAS data divided 1003 into time windows based on the general train velocity, in a similar fashion to that discussed above.

In each time window a time shift is determined 1004 for each channel of DAS data to align the data in that time window. If the characteristic time signal has already been derived from some other DAS data from another section of the track the time alignment may align the signals from each channel in the time windows to the identified characteristic train signal in order to provide velocity correction between the train speed at that channel and the train speed corresponding to the characteristic train signal.

The time shifts are then applied 1005 and the time windows recombined 1006 into a single data set. The characteristic train signal (whether or not derived from that data) may then be removed 1007. This will leave just the remainder data for that section of track corresponding to the acoustic response of that section of track and any irregular signals related to the train itself. This remainder data as discussed above may then be processed 1008 to remove the effect of any time shifting within the data from a given channel, i.e. divided back into the same time windows, the reverse time shifts applied and the data recombined.

The resulting remainder data from a given section of track thus can be seen as having a component which represents the acoustic response of the rail track and surrounding environment at that point to the passage of the train. In some embodiments the remainder data for a given section of track may be analysed 1009 with respect to one or more previously acquired remainder data for the same section of track to determine any significant difference. A significant change in the remainder data may, in some instances, be indicative of change in the properties of the track in that section which could be indicative of an occurrence or likely onset of a problem with the track.

Thus in some embodiments after each pass of a train over a given section of track the remainder data for that section of track may be acquired and analysed with respect to a reference profile. The reference profile may correspond to data acquired during one or more previous train passes. In some embodiments the reference profile may comprise a single derived value for each DAS sensor channel or group of channels.

In some embodiments the method may compare the newly acquired data to the reference profile. The reference profile may for instance comprise an average of the remainder data obtained from previous train passes. If the comparison indicates that the newly acquired remainder data is similar to the profile, e.g. within certain defined limits, it may be used to update the reference profile. If however there is a significant difference between the newly acquired remainder data and the profile then this may be indicative of a possible problem with the relevant section of track, for instance the occurrence or possible onset of the fault. In this case some sort of alert or alarm could be generated, for instance an alert to send an inspection crew to the relevant area and/or an alarm to take measures such as reducing speed limits in the area. A correlation between the newly acquired data and reference profile may be performed to highlight the areas of difference.

In some instances the response of a given section of track to a train pass may be substantially the same for any train passing over that section of track. Thus for any pass of any train the acoustic response of the track may be determined and compared to a reference profile. In some instances however the response may depend on the type of train, in which case there may be different reference profiles for a given section of track, each reference profiles being appropriate for a given train or type of train or a set of trains that have been determined to result in the same general response.

The acoustic response of a given section of track to a train pass may also depend on other factors such as prevailing environmental conditions. For instance the response to passage of a different train may be different in the winter compared to the summer, or due to the ambient temperature or amount of recent rainfall etc. There may therefore be different profiles corresponding to different environmental conditions or a reference profile could be adjusted in a known way to account for the prevailing environmental conditions at the time that the DAS data is/was acquired.

The analysis may therefore identify any significant differences between the newly acquired different data and an appropriate reference profile and indicate that the condition of the track or surrounding environment may have changed to a significant degree. In some embodiments however the data from several train passes may be analysed to perform trend analysis to identify any trends which could be indication of an ongoing change in condition of the track in a given location. The trend analysis may analyses the remainder data from several train passes to identify any trends in the data. A particular trend in the data from one or more given sensing portions, or a trend with a rate of change above a certain limit or which is increasing could be cause for concern and used to trigger various alerts. Such a trend analysis may be used as part of a preventative maintenance system and could provide an indication of deterioration of the track in a given location before failure occurs.

In some embodiments prediction may be applied to the remainder data obtained, for instance linear prediction may be applied, e.g. using Kalman filters or prediction-error filters or the like. The prediction-error filters may in effect maintain a model of the acoustic response of a given section of track and model how the response is changing. Any new data may be compared to the prediction to see if it matches Analysis of the remainder data in this way may be useful for a number of different condition monitoring and preventative maintenance functions. The method may, for instance be used to monitor the condition of:
    the rail itself, e.g. detection or prediction of rail break,
    the ballast of the rail track, e.g. detection or prediction of moving ballast;
    the rail sleepers, e.g. degradation or movement of the sleepers;
    the rail clamps holding the rails in place;
    the condition of points;
    the condition of wider rails network infrastructure such as bridges, tunnels, station platforms, embankments etc.

The remainder data produced by removing the characteristic train signal may in some instances also comprise components related to the train, rather than the track or wider environment, but which are different to the average or regular train signal and thus do not form part of the characteristic train signal. Comparing the remainder data with a reference profile formed from a number of train passes—which would not include any such transient train signals—may be used to identify such irregular train related components. Additionally or alternatively use of a prediction error filter as discussed may discriminated between signals in the remainder data that are train related as opposed to those related to the response of the local environment.

In some embodiments therefore the remainder data may be analysed to detect such train related components of the remainder data. Any such identified train related components may be analysed to provide information regarding the train and the operation or condition thereof.

For example consider that the shock damping of a particular coupling between railway cars has or is failing so that the two cars collide and separate relatively heavily when the relevant part of the train decelerates or accelerates. This may lead to occasional acoustic impact sounds being generated. Such impacts may be irregular and thus not identified as part of the characteristic train signal and as such would show up on the remainder data. These may be identified as being train related, rather than due to the local environment as they may only appear in the remainder data for that particular train and also instances of such sounds would move between the channels of the DAS remainder data at a speed related to the train speed. Identifying such signals in the remainder data may therefore be indicative of a problem with that part of the train.

One particular train related feature that may be determined from the remainder data may be how deceleration and/or acceleration forces propagate through the train. If a train starts to brake to decelerate it tends to start braking from the front and the braking force is propagated backwards through the train cars, with a braking force also exerted on the rail. This would create an effective backward propagating acoustic signal that would seemingly travel backwards compared to the reference frame of the train. As such this signal would not form part of a characteristic train signal but may be clearly visible as a propagating acoustic feature in the remainder data. The relative intensity of this signal in various parts of the train and/or track and how it propagates may provide useful information regarding the forces or stresses exerted on the train and the state of the couplings and brakes of the cars for example. Such information may be useful for overall condition monitoring or preventative maintenance of the train and track but also may be useful in informing how trains should travel through a given section of track to reduce unnecessary stress on the train and its components.

The remainder data may also allow identification of the onset of axle hunting by parts of the train. If the characteristic train signal is derived based on signal components as detected by DAS channels where the train is not exhibiting axle hunting or only minimal axle hunting is occurring, the onset of lateral oscillation of the axles in some channels may manifest itself as an amplitude modulation over the spatial dimension in the remainder data.

Linear prediction may also be applied to any train related signals detected in the remainder data.

It should be noted that the discussion above has focussed on subtracting the characteristic train signal from the DAS data to provide the remainder data. In some embodiments however the characteristic train signal may be effectively removed from the DAS data in other ways. For example in some embodiments a deconvolution may be applied to the DAS data based on the characteristic train signal. This more provide more information about the acoustic response of the environment to the stimulus of the train passing.

In some embodiments the characteristic train signal may in effect be seen as an acoustic point source stimulus for the surrounding environment. In such a case interferometric imaging techniques may be applied to the DAS data based on the characteristic train signal. Various interferometric imaging techniques are known from other fields such as seismography and may be applied to the DAS data to provide imaging of the environment surrounding the rail track.

As noted previously the characteristic train signal itself may additionally or alternatively be used to provide information about the train. As noted in relation to FIG. 9 the characteristic train signal may be analysed 909.

The characteristic train signal can be seen as effectively a signature or profile of that particular train. Such a train signature or profile may be used to determine one or more train properties and/or a change in train properties. In some embodiments therefore a characteristic train signal for a given train may be determined and compared to one or more reference train signals for that train. At least one reference train signal may comprise a previously acquired characteristic train signal for that particular train, i.e. a previous train profile, or be derived from one or more previously acquired characteristic train signals for that train.

Thus, for example, for a train that travels over a relatively long length of track a characteristic train signal could be produced from each of a plurality of sets of DAS data, each set of DAS data being acquired as the train passes along different sections of the track at different times. The characteristic train signals obtained may then be analysed to determine if there are any significant changes in the characteristic train signal over time. In effect the characteristic train signal derived from the earliest acquired DAS data may be used as an initial reference train signal. A significant change in the characteristic train signal may be indicative of change in the properties of the train which could be indicative of an occurrence or likely onset of a problem with the train.

For example consider that the train develops one or more wheel flats at a particular location along the train, i.e. at particular car of the train. As one skilled in the art will understand a wheel flat represents a distortion of the shape of the train wheel. The wheel flat may lead to the wheel striking the rail as it rotates, which clearly will have an impact on the acoustic signals generated by that part of the train as it travels. Thus development of a wheel flat may result in a change in the pattern of the acoustic signal from the corresponding section of the train. By detecting a change in the characteristic train signal corresponding to a certain location of the train it may be possible to detect the occurrence or onset of such a fault. It will of course be appreciated that wheel condition is just one example of a property of a train that may vary in use in a way that may influence the characteristic train signal and other properties may include other aspects of the wheelsets, e.g. type, bearing or axle condition, or the condition of the couplings between cars for example.

It should be noted that a characteristic train signal produced as described above is a signal characteristic of the train travelling at a certain velocity. It may therefore be necessary to scale the characteristic train signal and/or the reference signal to a common velocity for analysis, e.g. comparison. This may be a relatively simple time scaling as the characteristic train signal produced as discussed above is produced in a way which means that the whole of the characteristic train signal corresponds to substantially the same velocity. In some embodiments a determined characteristic train signal may be scaled to correspond to a predetermined velocity or processed to provide a velocity independent train profile. In some instances however at least some aspects of the characteristic train signal that are of interest for condition monitoring of the train may not be truly velocity independent and thus it may be useful to determine the characteristic train signal based on the velocity of the train at that time and then compared with a reference train signal appropriate to that velocity. There may thus be different reference train signals corresponding to different velocity band of the train.

If the characteristic train signal does not change significantly then in some embodiments the various acquired characteristic train signals may be combined to form a reference train signal for that train. Subsequent passes of that train over the same or different section of track can be used to form a new characteristic train signal that can be compared to the reference for ongoing condition monitoring of the train.

The characteristic train signals for various trains may also in some embodiments be used to assist in identification and/or tracking of different trains on the rail network.

In some embodiments the characteristic train signal could additionally or alternatively be analysed to detect the presence or absence of one or more predefined signatures of interest. Some conditions affecting a train, e.g. such as the presence of wheel flats, may be expected to lead to a certain defined signature in the characteristic train signal, e.g. a repetitive component at a frequency related to the train speed. Detection of such a signature in the characteristic train signal may thus signal that the train has or is developing a property of interest which could be used to signal some action, from scheduling a maintenance check to signalling that the relevant train should be withdrawn from operation.

It should be noted that the above-mentioned embodiments illustrate rather than limit the invention, and that those skilled in the art will be able to design many alternative embodiments without departing from the scope of the appended claims. Features from various embodiments may be combined and used together except where expressly indicated otherwise. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of monitoring a rail network comprising:
taking a first data set corresponding to measurement signals from a plurality of channels of at least one fibre optic distributed acoustic sensor having a sensing fibre deployed to monitor at least part of the path of the rail network, wherein the first data set corresponds to measurement signals acquired as a train passed along a first monitored section of the rail network;
identifying a speed of the train through the first monitored section;
dividing the first data set into a plurality of time windows, each time window comprising a different subset of the first data set, wherein each time window comprises measurement signals from the plurality of channels, the measurement signal for each successive channel in a time window being delayed with respect to the previous channel by a time related to the identified train speed;
for each time window, identifying and applying any time shift to the measurement signals for a channel so as to substantially align the measurement signals of the channels within the time window;
combining the time windows after any time shifts have been applied to form an aligned first data set; and
deriving a characteristic train signal from the aligned first data set.

2. A method as claimed in claim 1 wherein said time windows overlap with one another.

3. A method as claimed in claim 1 wherein the characteristic train signal is derived by summing the measurement signals of a plurality of the channels of the aligned first data set.

4. A method as claimed in claim 1 wherein identifying and applying any time shift to the measurement signals for a channel so as to substantially align the measurement signals of the channels within the time window comprises summing the measurement signals of at least some of the channels to form a pilot signal and iteratively for each channel identifying a time shift to align that measurement signal for that channel to the pilot signal and updating the pilot signal.

5. A method as claimed in claim 1 wherein identifying and applying any time shift to the measurement signals for a channel so as to substantially align the measurement signals of the channels within the time window comprises applying at least first and second alignment passes.

6. A method as claimed in claim 5 wherein the first alignment pass is applied to measurement signals in the time windows that have been at least one: low pass filtered and processed to a lower resolution.

7. A method as claimed in claim 6 wherein the first alignment pass is used to determine a first set of time shifts which are applied to the channels each time window before the second alignment pass.

8. A method as claimed in claim 1 further comprising removing the characteristic train signal from a data set of interest to leave a remainder data set.

9. A method as claimed in claim 8 wherein the data set of interest comprises the aligned first data set.

10. A method as claimed in claim 8 wherein the data set of interest comprises an aligned second data set, the aligned second data set corresponding to a second data set of measurement signals from a plurality of channels of at least one fibre optic distributed acoustic sensor acquired as the train passed along a second monitored section of the rail network that has been processed to align the measurement signals from different channels.

11. A method as claimed in claim 10 further comprising forming the aligned second data set by:
taking the second data set;
identifying a speed of the train through the second monitored section;
dividing the second data set into a plurality of time windows, each time window comprising a different subset of the second data set, wherein each time window comprises measurement signals from the plurality of channels, the measurement signal for each successive channel in a time window being delayed with respect to the previous channel by a time related to the identified train speed through the second section;
for each time window, identifying and applying any time shift to the measurement signals for a channel so as to substantially align the measurement signals of the channels within the time window;
combining the time windows after any time shifts have been applied to form the aligned second data set.

12. A method as claimed in claim 8 comprising processing the remainder data set to reverse any time shifts applied to align the measurement data from different channels.

13. A method as claimed in claim 8 wherein a deconvolution is applied to the data set of interest based on the characteristic train signal to leave the remainder data set.

14. A method as claimed in claim 8 comprising applying interferometric imaging techniques to the data set of interest based on the characteristic train signal as a source signal.

15. A method as claimed in claim 8 comprising analysing the remainder data set with respect to one or more previously acquired remainder data sets for the same section of track.

16. A method as claimed in claim 15 comprising comparing the remainder data set with at least one reference track profile.

17. A method as claimed in claim 15 comprising performing trend analysis based on said remainder data set and said one or more previously acquired remainder data sets.

18. A method as claimed in claim 15 comprising identifying any train related components of signals in the remainder data.

19. A method as claimed in claim 1 comprising analysing the characteristic train signal by comparing the characteristic train signal to one or more reference train signals for that train.

20. A rail network monitoring apparatus comprising;
a memory for storing a first data set corresponding to measurement signals from a plurality of channels of at least one fibre optic distributed acoustic sensor having a sensing fibre deployed to monitor at least part of the path of the rail network, wherein the first data set corresponds to measurement signals acquired as a train passed along a first monitored section of the rail network; and
a processor configured to:
identify a speed of the train through the first monitored section;
divide the first data set into a plurality of time windows, each time window comprising a different subset of the first data set, wherein each time window comprises measurement signals from the plurality of channels, the measurement signal for each successive channel in a time window being delayed with respect to the previous channel by a time related to the identified train speed;
for each time window, identify and apply any time shift to the measurement signals for a channel so as to substantially align the measurement signals of the channels within the time window;
combine the time windows after any time shifts have been applied to form an aligned first data set; and
derive a characteristic train signal from the aligned first data set.

21. A rail network monitoring apparatus comprising;
a memory for storing a first data set corresponding to measurement signals from a plurality of channels of at least one fibre optic distributed acoustic sensor having a sensing fibre deployed to monitor at least part of the path of the rail network, wherein the first data set corresponds to measurement signals acquired as a train passed along a first monitored section of the rail network; and
a processor configured to:
identify a speed of the train through the first monitored section;
divide the first data set into a plurality of time windows, each time window comprising a different subset of the first data set, wherein each time window comprises measurement signals from the plurality of channels, the measurement signal for each successive channel in a time window being delayed with respect to the previous channel by a time related to the identified train speed;
for each time window, identify and apply any time shift to the measurement signals for a channel so as to substantially align the measurement signals of the channels within the time window;
combine the time windows after any time shifts have been applied to form an aligned first data set; and
remove a characteristic train signal from the aligned first data set to leave a remainder data set.

* * * * *